US012683337B2

(12) United States Patent
Youn et al.

(10) Patent No.: US 12,683,337 B2
(45) Date of Patent: Jul. 14, 2026

(54) ADAPTER CAPABLE OF PROTECTIVE GROUNDING

(71) Applicant: SAMSUNG ELECTRONICS CO., LTD., Suwon-si (KR)

(72) Inventors: Jaesub Youn, Suwon-si (KR); Minhyung Yoo, Suwon-si (KR); Jinseock Lee, Suwon-si (KR)

(73) Assignee: SAMSUNG ELECTRONIC CO., LTD., Gyeonggi-Do (KR)

( * ) Notice: Subject to any disclaimer, the term of this patent is extended or adjusted under 35 U.S.C. 154(b) by 464 days.

(21) Appl. No.: 18/496,916

(22) Filed: Oct. 30, 2023

(65) Prior Publication Data

US 2024/0063590 A1 Feb. 22, 2024

Related U.S. Application Data

(63) Continuation of application No. PCT/KR2022/003340, filed on Mar. 10, 2022.

(30) Foreign Application Priority Data

Apr. 30, 2021 (KR) ........................ 10-2021-0056660

(51) Int. Cl.

| | |
|---|---|
| ***H01R 13/71*** | (2006.01) |
| ***H01R 13/24*** | (2006.01) |
| ***H01R 13/46*** | (2006.01) |

(52) U.S. Cl.

CPC ............. *H01R 13/71* (2013.01); *H01R 13/24* (2013.01); *H01R 13/2435* (2013.01); *H01R 13/46* (2013.01)

(58) Field of Classification Search

CPC .... H01R 13/71; H01R 13/24; H01R 13/2435; H01R 13/46; H01R 13/7031; H01R 24/30;

(Continued)

(56) References Cited

U.S. PATENT DOCUMENTS 4,954,091 A 9/1990 Marble et al.
6,126,460 A * 10/2000 Wu ........................ H01R 35/04 439/640

(Continued)

FOREIGN PATENT DOCUMENTS

JP 4830027 B2 12/2011
JP 6167873 B2 7/2017

(Continued)

OTHER PUBLICATIONS

International Search Report mailed Jun. 21, 2022 for PCT/KR2022/003340.

*Primary Examiner* — Truc T Nguyen

(74) *Attorney, Agent, or Firm* — CANTOR COLBURN LLP

(57) ABSTRACT

An adapter includes a housing, a pair of pins connected to the housing, a switch connected to the housing to be translationally movable relative to the housing and including at least a portion exposed to an outside of the housing, a main shaft fixed to an inside of the housing, at least one wing plate rotatably connected to the main shaft and able to be open or closed relative to the housing, an elastic body provided between the main shaft and the switch, and at least one arm connected to the switch and pressing the wing plate by integrally moving with the switch.

20 Claims, 9 Drawing Sheets

(58) Field of Classification Search
CPC .............. H01R 13/652; H01R 2103/00; H01R 13/648; H01R 13/04; H01R 31/06
See application file for complete search history.

(56) References Cited

U.S. PATENT DOCUMENTS

| | | | | |
|---|---|---|---|---|
| 7,354,286 | B1 * | 4/2008 | Lee | H01R 13/652<br>439/652 |
| 9,077,093 | B1 * | 7/2015 | Roy | H02K 49/10 |
| 9,331,441 | B2 * | 5/2016 | Roy | H01R 24/68 |
| 2009/0186519 | A1 * | 7/2009 | Chin | H01R 13/6658<br>439/489 |
| 2011/0045677 | A1 | 2/2011 | Devlin et al. | |
| 2016/0322747 | A1 * | 11/2016 | Jian | H01R 13/639 |
| 2020/0106214 | A1 * | 4/2020 | Du | H01R 24/30 |
| 2024/0006792 | A1 * | 1/2024 | Shieh | H01R 13/625 |

FOREIGN PATENT DOCUMENTS

| | | | |
|---|---|---|---|
| KR | 200335168 | Y1 | 12/2003 |
| KR | 100573088 | B1 | 9/2006 |
| KR | 100908480 | B1 | 7/2009 |
| KR | 20120080924 | A | 7/2012 |
| KR | 20160002120 | A | 1/2016 |
| KR | 102204600 | B1 | 1/2021 |

* cited by examiner

ADAPTER CAPABLE OF PROTECTIVE GROUNDING

CROSS-REFERENCE TO RELATED APPLICATIONS

This application is a continuation application of International Application No. PCT/KR2022/003340 designating the United States, filed on Mar. 10, 2022, claiming priority to Korean Patent Application No. 10-2021-0056660, filed on Apr. 30, 2021, in the Korean Intellectual Property Office, the disclosures of which are incorporated by reference herein in their entireties.

BACKGROUND

1. Field

The disclosure relates to an adapter capable of protective grounding (or earthing).

2. Description of Related Art

Typically, electronic devices have different used voltages depending on the type and purpose of the electronic device, and the shapes of the input units receiving power also vary depending on the products. Accordingly, to supply appropriate power to an electronic device, a connector having an appropriate shape for the input unit may be desired and a power adapter, which is a power conversion supply device, performs such function.

A power adapter is a device that converts alternating current (AC) into direct current (DC) and supplies the power to various electronic devices, such as a laptop, a desktop, a display monitor, or a mobile phone using AC. In addition, the power adapter is used as a device for supplying the power desired to charge a battery or operate an electronic device.

To reduce leakage current and electromagnetic noise, conventionally, a 3-prong adapter was mainly used. However, the 3-prong adapter has a relatively greater volume than a 2-prong adapter. By considering a slim design and user convenience, the conventional 3-prong adapter has been replaced with the 2-prong adapter.

Compared to the 3-prong adapter, the 2-prong adapter has a slim design and excellent portability. However, because it is difficult to implement protective grounding, the 2-prong adapter may have difficulty in reducing leakage current and electromagnetic noise. There is a method of using a high-performance transformer and an EL board to reduce leakage current and electromagnetic noise in a 2-prong adapter without protective grounding. However, when using the high-performance transformer, the cost of the adapter may excessively increase. In addition, a 2-prong adapter may have insufficient space for accommodating the high-performance transformer and when inserting the EL board into a system, it may be difficult to insert into an appropriate position for optimal performance and a tool design may be limited.

Accordingly, there is a technical limitation in reducing leakage current and electromagnetic noise of a 2-prong adapter only with an internal circuit in the adapter and improvements of a system without protective grounding and there is a need for a technique to resolve this.

SUMMARY

An embodiment is provided for an adapter implementing protective grounding through a rotating wing plate while being inserted into an outlet and having a shape of a 2-prong adapter.

In an embodiment, an adapter capable of protective grounding includes a housing, a pair of pins connected to the housing, a switch connected to the housing to be translationally movable relative to the housing and including at least a portion exposed to an outside of the housing, a main shaft fixed to an inside of the housing, at least one wing plate rotatably connected to the main shaft and able to be open or closed relative to the housing, an elastic body provided between the main shaft and the switch, and at least one arm connected to the switch and pressing the wing plate by integrally moving with the switch.

In an embodiment, an adapter capable of protective grounding is disposed (e.g., mounted) on an outlet defining an outlet groove including a bottom surface in which two outlet holes are defined, and including a grounding terminal provided on one side of the outlet groove, and the adapter includes a housing inserted into the outlet groove, a pair of pins connected to the housing and inserted into the two outlet holes, a switch connected to the housing to be translationally movable relative to the housing and including at least a portion exposed to an outside of the housing, a main shaft fixed to an inside of the housing, at least one wing plate rotatably connected to the main shaft and contactable with the grounding terminal, an elastic body provided between the main shaft and the switch, and at least one arm connected to the switch and pressing the wing plate such that the wing plate contacts the grounding terminal.

In an embodiment, an adapter capable of protective grounding includes a housing including a housing body including an outer side surface from which a receiving groove is recessed, a pair of pins connected to the housing, a switch connected to the housing to be translationally movable relative to the housing, disposed between the pair of pins, provided in parallel with the pins and including at least a portion exposed to an outside of the housing, a main shaft fixed to an inside of the housing, at least one wing plate rotatably connected to the main shaft, an elastic body provided between the main shaft and the switch, and at least one arm connected to the switch and pressing the wing plate by integrally moving with the switch, where the wing plate is provided in one of a closed state in which the wing plate is inserted into the receiving groove and an opened state in which the wing plate escapes from the receiving groove.

An adapter capable of protective grounding in an embodiment may implement protective grounding through a wing plate that rotates while being inserted into an outlet and having a shape of a 2-prong adapter.

In addition, various effects directly or indirectly ascertained through the disclosure may be provided.

BRIEF DESCRIPTION OF THE DRAWINGS

The above and other features and advantages of illustrative embodiments of the disclosure will be more apparent from the following detailed description, taken in conjunction with the accompanying drawings, in which.

DETAILED DESCRIPTION

Figure 1:
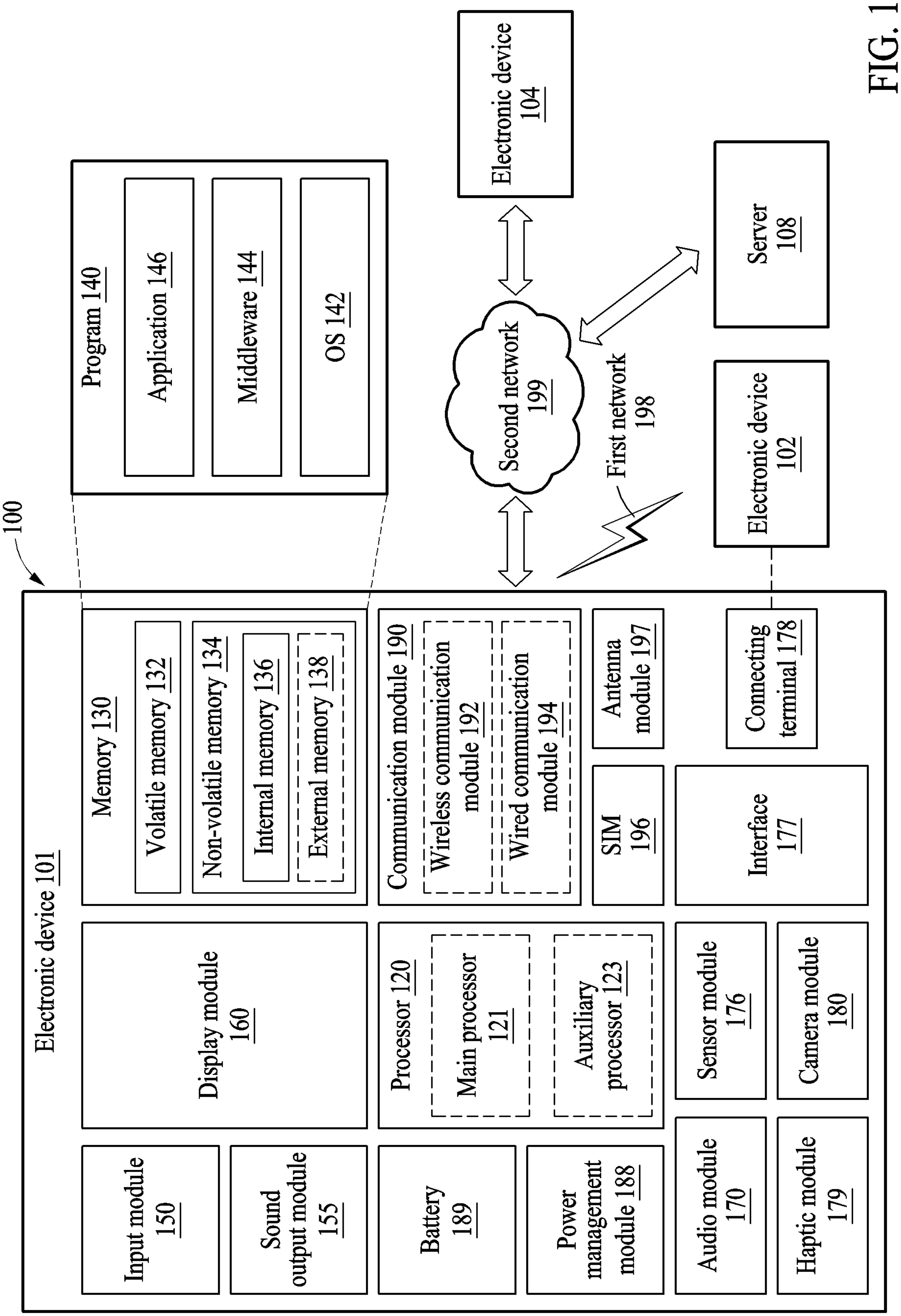
FIG. 1 is a block diagram of an embodiment of an electronic device in a network environment.

Hereinafter, embodiments will be described in detail with reference to the accompanying drawings. When describing the embodiments with reference to the accompanying drawings, like reference numerals refer to like elements and a repeated description related thereto will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of an electronic device 101 in a network environment 100. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). In an embodiment, the electronic device 101 may communicate with the electronic device 104 via the server 108. In an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute software (e.g., a program 140) to control at least one other component (e.g., a hardware or software component) of the electronic device 101 connected to the processor 120, and may perform various data processing or computation, for example. In an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. In an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. In an embodiment, when the electronic device 101 includes the main processor 121 and the auxiliary processor 123, the auxiliary processor 123 may be adapted to consume less power than that of the main processor 121 or to be predetermined to a specified function, for example. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). In an embodiment, the auxiliary processor 123 (e.g., an ISP or a CP) may be implemented as a portion of another component (e.g., the camera module 180 or the communication module 190) that is functionally related to the auxiliary processor 123. In an embodiment, the auxiliary processor 123 (e.g., an NPU) may include a hardware structure specified for artificial intelligence (AI) model processing. An AI model may be generated by machine learning. Such learning may be performed by, e.g., the electronic device 101 in which artificial intelligence is performed, or performed via a separate server (e.g., the server 108). Learning algorithms may include, but are not limited to, e.g., supervised learning, unsupervised learning, semi-supervised learning, or reinforcement learning. The AI model may include a plurality of artificial neural network layers. An artificial neural network may include a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, for example, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include software (e.g., the program 140) and input data or output data for a command related thereto, for example. The memory 130 may include the volatile memory 132 or the non-volatile memory 134.

The program 140 may be stored as software in the memory 130 and may include an operating system (OS) 142, middleware 144, or an application 146, for example.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen), for example.

The sound output module 155 may output a sound signal to the outside of the electronic device 101. The sound output module 155 may include a speaker or a receiver, for example. The speaker may be used for general purposes, such as playing multimedia or playing record. The receiver may be used to receive an incoming call. In an embodiment, the receiver may be implemented separately from the speaker or as a part of the speaker.

The display module 160 may visually provide information to the outside (e.g., a user) of the electronic device 101. The display module 160 may include a control circuit for controlling a display, a hologram device, or a projector and control circuitry to control a corresponding one of the display, the hologram device, and the projector, for example. In an embodiment, the display module 160 may include a touch sensor adapted to sense a touch, or a pressure sensor adapted to measure an intensity of a force incurred by the touch.

The audio module 170 may convert a sound into an electric signal or vice versa. In an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. In an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor, for example.

The interface 177 may support one or more specified protocols to be used for the electronic device 101 to be coupled with the external electronic device (e.g., the electronic device 102) directly (e.g., by wire) or wirelessly. In an embodiment, the interface 177 may include a high-definition multimedia interface (HDMI), a universal serial bus (USB) interface, a secure digital (SD) card interface, or an audio interface, for example.

The connecting terminal 178 may include a connector via which the electronic device 101 may be physically connected to an external electronic device (e.g., the electronic device 102). In an embodiment, the connecting terminal 178 may include an HDMI connector, a USB connector, an SD card connector, or an audio connector (e.g., a headphone connector), for example.

The haptic module 179 may convert an electrical signal into a mechanical stimulus (e.g., a vibration or a movement) or an electrical stimulus which may be recognized by a user via his or her tactile sensation or kinesthetic sensation. In an embodiment, the haptic module 179 may include a motor, a piezoelectric element, or an electric stimulator, for example.

The camera module 180 may capture a still image and moving images. In an embodiment, the camera module 180 may include one or more lenses, image sensors, ISPs, or flashes.

The power management module 188 may manage power supplied to the electronic device 101. In an embodiment, the power management module 188 may be implemented as at least a part of a power management integrated circuit (PMIC), for example.

The battery 189 may supply power to at least one component of the electronic device 101. In an embodiment, the battery 189 may include a primary cell which is not rechargeable, a secondary cell which is rechargeable, or a fuel cell, for example.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a relatively high data transmission rate.

The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a relatively large scale antenna. The wireless communication module 192 may support various requirements specified in the electronic device 101, an external electronic device (e.g., the electronic device 104), or a network system (e.g., the second network 199). In an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 millisecond (ms) or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. In an embodiment, the antenna module 197 may include an antenna including a radiating element including a conductive material or a conductive pattern formed in or on a substrate (e.g., a printed circuit board (PCB)). In an embodiment, the antenna module 197 may include a plurality of antennas (e.g., array antennas). In such a case, at least one antenna appropriate for a communication scheme used in a communication network, such as the first network 198 or the second network 199, may be selected by the communication module 190 from the plurality of antennas, for example. The signal or the power may be transmitted or received between the communication module 190 and the external electronic device via the at least one selected antenna. In an embodiment, another component (e.g., a radio frequency integrated circuit (RFIC)) other than the radiating element may be additionally formed as a part of the antenna module 197.

In an embodiment, the antenna module 197 may form a mmWave antenna module. In an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

In an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. In an embodiment, all or some of operations to be executed by the electronic device 101 may be executed at one or more of the external electronic devices 102, 104, and 108. In an embodiment, when the electronic device 101 needs to perform a function or a service automatically, or in response to a request from a user or another device, the electronic device 101, instead of, or in addition to, executing the function or the service, may request one or more external electronic devices to perform at least part of the function or the service, for example. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. In an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device in embodiments may be one of various types of electronic devices. The electronic device may include a portable communication device (e.g., a smartphone), a computer device, a portable multimedia device, a portable medical device, a camera, a wearable device, or a home appliance device, for example. In an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other features (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, e.g., "logic", "logic block", "part", or "circuitry". A module may be a single integral component, or a minimum unit or part thereof, adapted to perform one or more functions. In an embodiment, the module may be implemented in a form of an application-specific integrated circuit (ASIC), for example.

Various embodiments as set forth herein may be implemented as software (e.g., the program 140) including one or more instructions that are stored in a storage medium (e.g., an internal memory 136 or an external memory 138) that is readable by a machine (e.g., the electronic device 101). In an embodiment, a processor (e.g., the processor 120) of the machine (e.g., the electronic device 101) may invoke at least one of the one or more instructions stored in the storage medium and execute the at least one of the one or more instructions, for example. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to various embodiments disclosed herein may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

In embodiments, each component (e.g., a module or a program) of the above-described components may include a single entity or multiple entities, and some of the multiple entities may be separately disposed in different components. In embodiments, one or more of the above-described components may be omitted, or one or more other components may be added. In an alternative embodiment or additionally, a plurality of components (e.g., modules or programs) may be integrated into a single component. In such embodiments, the integrated component may still perform one or more functions of each of the plurality of components in the same or similar manner as the one or more functions are performed by a corresponding one of the plurality of components before the integration. In embodiments, operations performed by the module, the program, or another component may be carried out sequentially, in parallel, repeatedly, or heuristically, or one or more of the operations may be executed in a different order or omitted, or one or more other operations may be added.

Figure 2A:
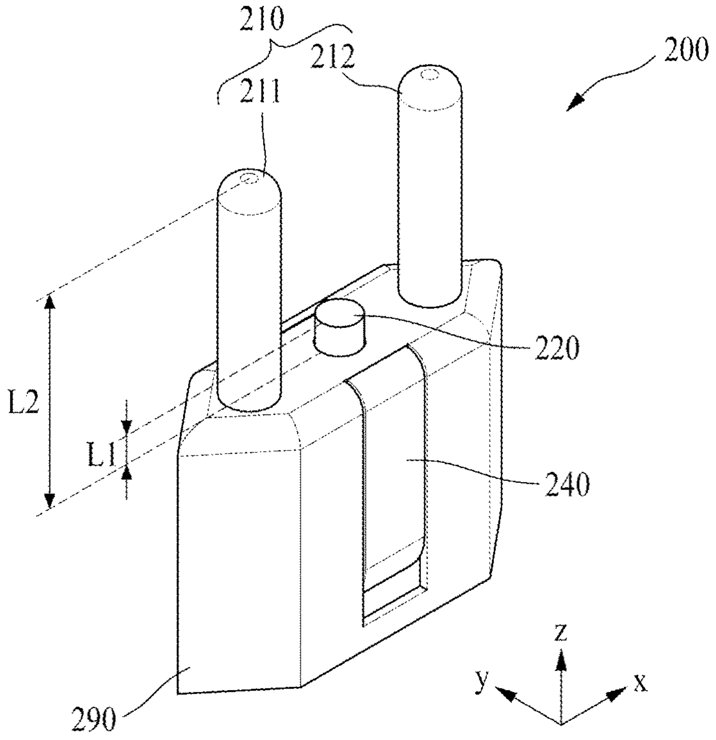
FIG. 2A is a perspective view of an embodiment of an adapter capable of protective grounding when a wing plate is in a closed state.
Figure 2B:
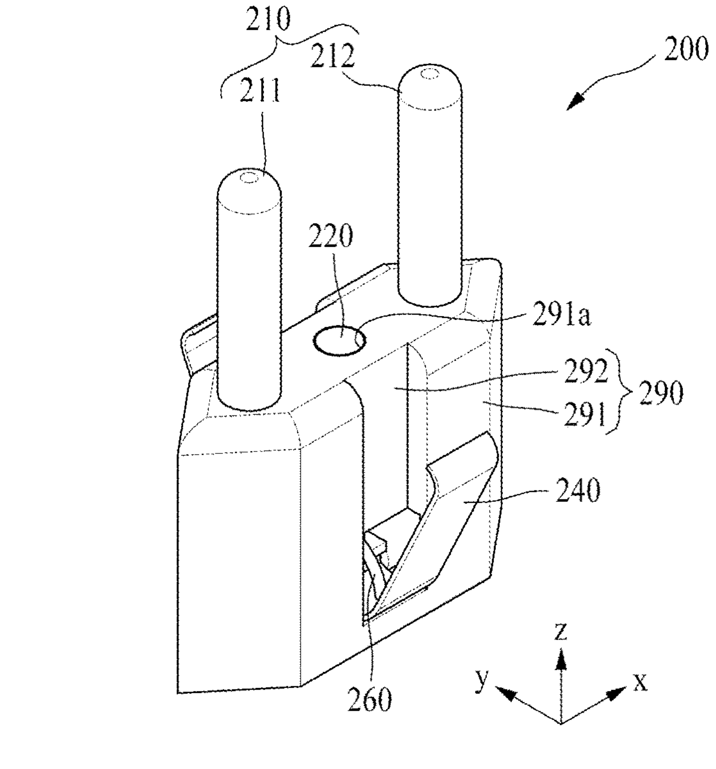
FIG. 2B is a perspective view of an embodiment of an adapter capable of protective grounding when a wing plate is in an opened state.
Figure 3:
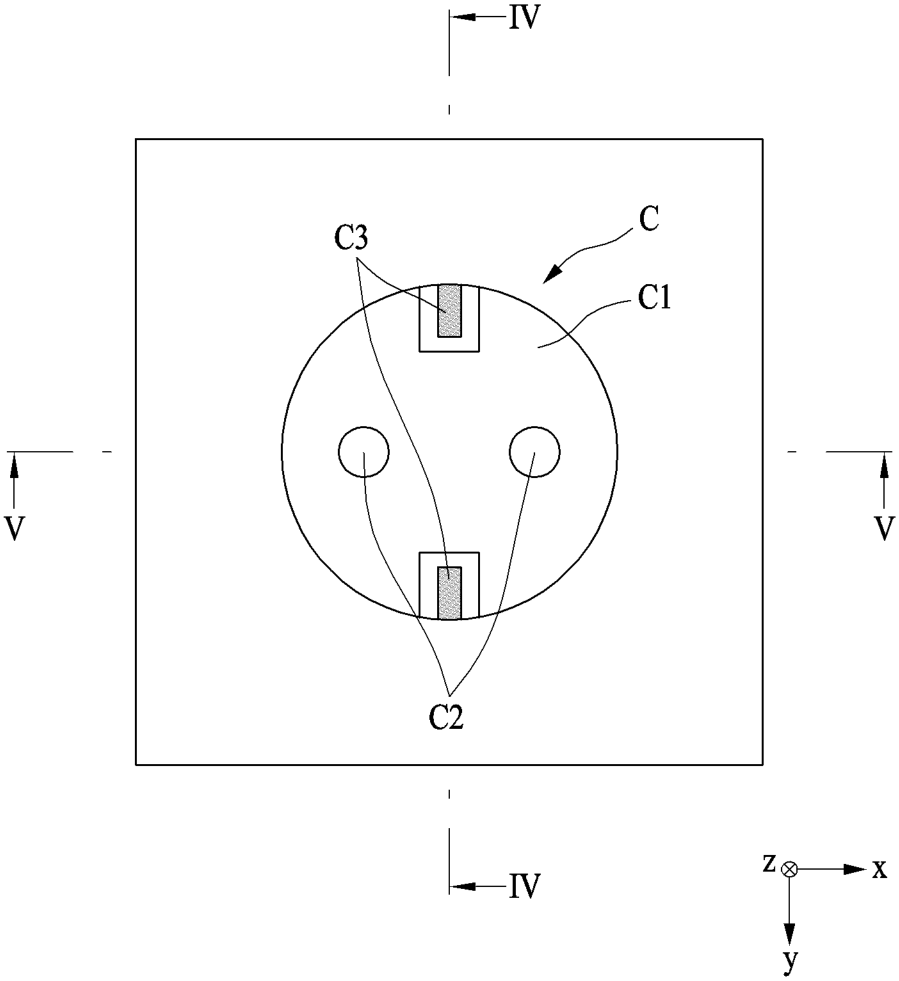
FIG. 3 is a plan view of an embodiment of an outlet.

FIG. 2A is a perspective view of an embodiment of an adapter capable of protective grounding when a wing plate is in a closed state, and FIG. 2B is a perspective view of an embodiment of an adapter capable of protective grounding when a wing plate is in an opened state. FIG. 3 is a plan view of an embodiment of an outlet.

Referring to FIGS. 2A to 3, an adapter 200 capable of protective grounding (hereinafter, also referred to as the "adapter") in an embodiment may be used to supply power to an electronic device (e.g., the electronic device 100 of FIG. 1). In an embodiment, the adapter 200 may change power from alternating current (AC) to direct current (DC) and supply power to an electronic device (e.g., the electronic device 100 of FIG. 1), for example.

In an embodiment, the adapter 200 may have a compact structure. The adapter 200 may have a shape that is relatively wide in a first direction (an x-axis direction) while having a shape that is relatively narrow in a second direction (a y-axis direction) intersecting the first direction (an x direction). The adapter 200 may be inserted into an outlet C. The outlet C may define an outlet groove C1 for accommodating the entirety of the adapter 200, and two outlet holes C2 may be defined in a bottom surface of the outlet groove C1. The outlet C may include a grounding terminal C3 provided on one side of the outlet groove C1. The grounding terminal C3 may be electrically connected to a ground of a building in which the outlet C is installed. The adapter 200 may include a housing 290, a pair of pins 210, a switch 220, and at least one wing plate 240.

The housing 290 may include a hollow to accommodate other components of the adapter 200. The housing 290 may include a housing body 291 defining a guide hole 291*a* for guiding movement of the switch 220 and a receiving groove 292 recessed from an outer side surface of the housing body 291. In an embodiment, the guide hole 291*a* may be a hole penetrating the housing body 291 in the z-axis direction, for example. The receiving groove 292 may accommodate the wing plate 240.

The pair of pins 210 may be connected to the housing 290. The pair of pins 210 may include a first pin 211 and a second pin 212 spaced apart from each other. The first pin 211 and the second pin 212 may be spaced apart from each other in a first direction (the x-axis direction). The first pin 211 and the second pin 212 may be fixed to the housing 290. At least a portion of the first pin 211 and at least a portion of the second pin 212 may be accommodated in the housing 290 and the other portion of the first pin 211 and the other portion of the second pin 212 may protrude toward an outside of the housing 290. The pair of pins 210 may be inserted into the outlet hole C2.

The switch 220 may be connected to the housing 290 to enable translational movement of the switch 220 relative to the housing 290. The switch 220 may have a pillar shape. The switch 220 may translationally move along the housing 290. In an embodiment, the switch 220 may move in the z-axis direction, for example. The switch 220 may protrude from the housing 290 by moving in the +z direction or may be inserted into the housing 290 by moving in the −z direction. A length L1 that the switch 220 protrudes from the housing 290 may be less than a length L2 that the pin 210 protrudes from the housing 290.

The switch 220 may be exposed to the outside. The switch 220 may be exposed to the outside and may receive an external force while the external force is not applied to the housing 290. In an embodiment, while an adapter is inserted into the outlet C, when the housing 290 does not contact the bottom surface of the outlet groove C1, the switch 220 may contact the bottom surface of the outlet groove C1, for example.

At least one wing plate 240 may be rotatably connected to a shaft (not shown) provided inside the housing 290 and may be open or closed relative to the housing 290. A state of the wing plate 240 may switch between a closed state and an opened state. In an embodiment, FIG. 2A illustrates the wing plate 240 in the closed state and FIG. 2B illustrates the wing plate 240 in the opened state, for example. When the wing plate 240 is in the closed state, the wing plate 240 may be accommodated in the receiving groove 292 of the housing 290. As the wing plate 240 is accommodated in the receiving groove 292, when the wing plate 240 is in the closed state, the wing plate 240 may not protrude to the outside of the housing 290, or even when the wing plate 240 protrudes, the height of protrusion may decrease.

In an illustrated embodiment, two wing plates 240 are provided at opposite sides to each other based on the switch 220. However, the disclosure is not limited thereto. In an embodiment, only one wing plate 240 may be provided, for example.

In an embodiment, the adapter 200 may have a slim structure by causing the wing plate 240 to be in the closed state before the adapter 200 is inserted into the outlet C. While the adapter 200 is fully inserted into the outlet C, the adapter 200 may cause the wing plate 240 to contact the grounding terminal C3. When the wing plate 240 contacts the grounding terminal C3, the ground of an electronic device (e.g., the electronic device 100 of FIG. 1) may be connected to the ground of a building, thereby leakage current and electromagnetic noise may decrease. In an embodiment, the adapter 200 may further include an arm 260 connected to the switch 220. The arm 260 may press the wing plate 240 as the arm 260 integrally moves with the switch 220, for example, but is not limited thereto.

Figure 4A:
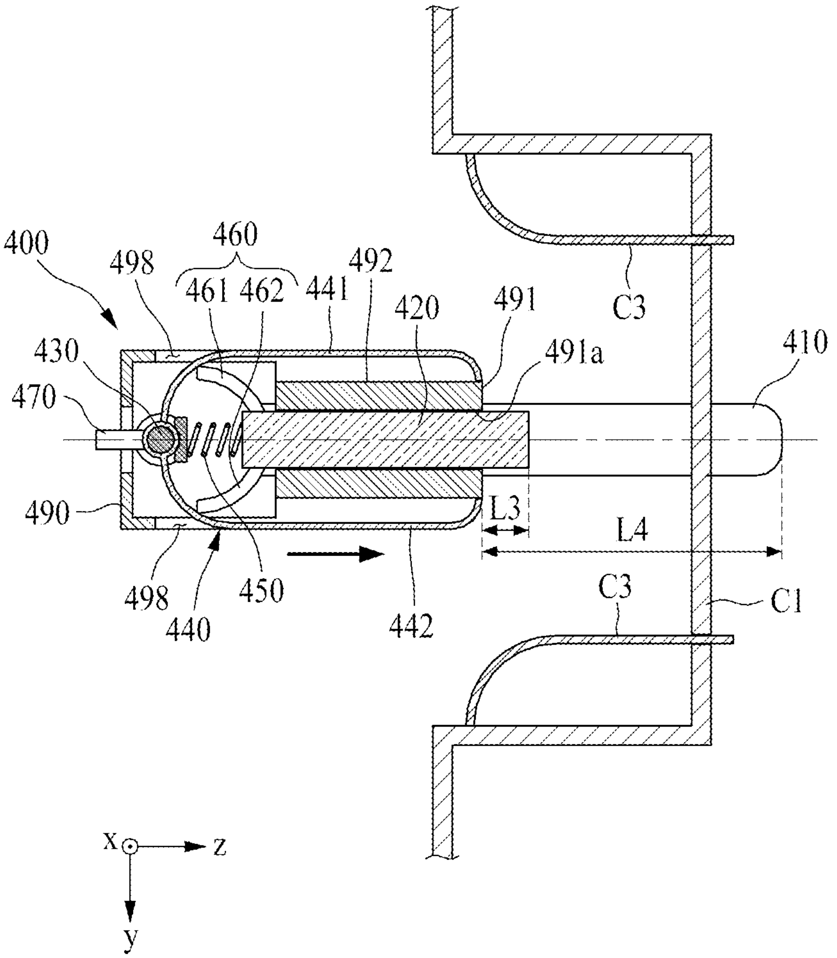
FIG. 4A is a cross-sectional view taken along line IV-IV of FIG. 3 and illustrating a wing plate in a closed state.
Figure 4B:
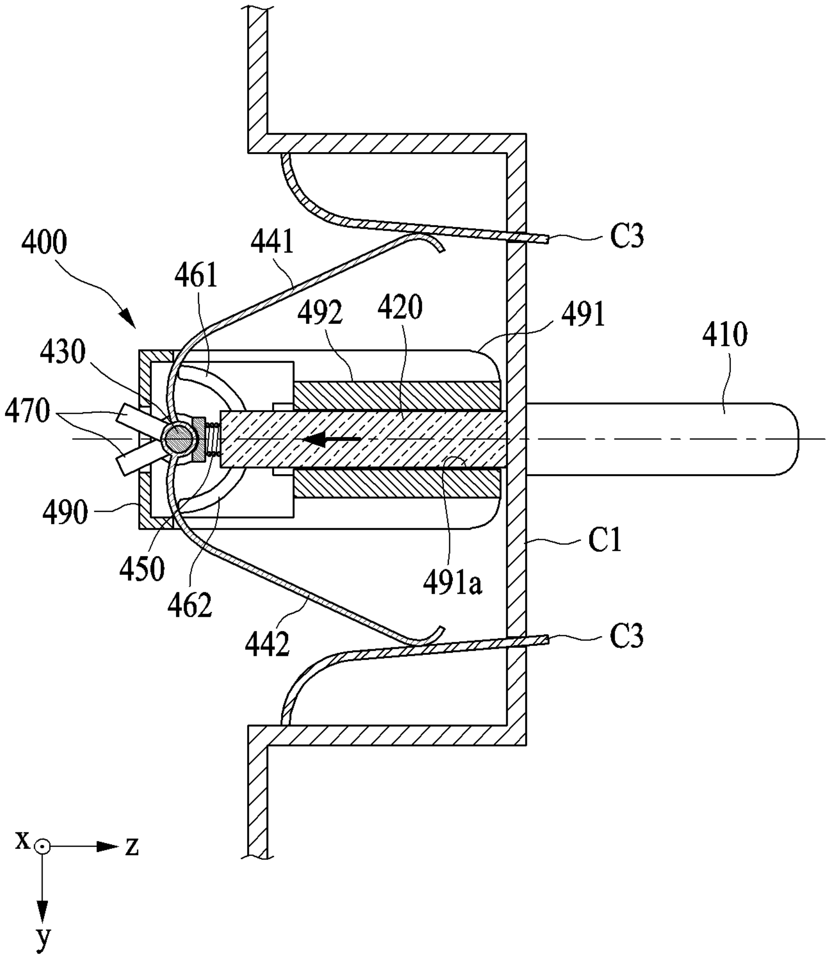
FIG. 4B is a cross-sectional view taken along line IV-IV of FIG. 3 and illustrating a wing plate in an opened state.

FIG. 4A is a cross-sectional view taken along line IV-IV of FIG. 3 and illustrating a wing plate in a closed state. FIG. 4B is a cross-sectional view taken along line IV-IV of FIG. 3 and illustrating a wing plate in an opened state.

Referring to FIGS. 4A and 4B, in an embodiment, an adapter 400 may include a housing 490, a pin 410, a switch 420, a main shaft 430, a wing plate 440, an elastic body 450, an arm 460, and a connection line 470. The housing 490 may include a housing body 491 defining a guide hole 491*a* for guiding movement of the switch 420 and a receiving groove 492 recessed from an outer side surface of the housing body 491 and accommodating the wing plate 440.

The housing 490 may have a shape that is relatively thick in a first direction (an x-axis direction) while having a shape that is relatively thin in a second direction (a y-axis direction) intersecting the first direction. The housing 490 may be spaced apart from the grounding terminal C3. One surface of the housing 490 may contact the bottom surface of the outlet groove C1.

The pin 410 may pass the bottom surface of the outlet groove C1.

The switch 420 may move inside of the housing 490 by being pressed by the bottom surface of the outlet groove C1. While the housing 490 moves in the +z direction, the switch 420 may move in the −z direction by being pressed by the bottom surface of the outlet groove C1. The switch 420 may be provided in parallel with the pin 410, may be guided by the guide hole 491*a*, and may translationally move in the z-axis direction that is a longitudinal direction of the pin 410.

The main shaft 430 may be fixed to the inside of the housing 490. The main shaft 430 may support the wing plate 440 such that the wing plate 440 may rotate.

The wing plate 440 may rotate around the main shaft 430. The wing plate 440 may physically and/or electrically contact the grounding terminal C3. A pair of wing plates 440 may be provided. In an embodiment, the pair of wing plates 440 may include a first wing plate 441 and a second wing plate 442 provided at opposite sides to each other based on the switch 420, for example. The first wing plate 441 and the second wing plate 442 may rotate in opposite directions and may be electrically connected to each other by respectively contacting different grounding terminals C3. A side surface of the housing 490 may define a housing insertion hole 498 for accommodating the wing plate 440. The housing insertion hole 498 may provide a free space for the wing plate 440 to rotate. In an embodiment, the housing 490 may include a waterproof structure for opening and closing the housing insertion hole 498, for example.

The first wing plate 441 may rotate in a counterclockwise direction based on the main shaft 430 during the transition from the closed state to the opened state. In other words, the first wing plate 441 may move in the −y direction during the transition from the closed state to the opened state. The second wing plate 442 may rotate in a clockwise direction based on the main shaft 430 during the transition from the closed state to the opened state. In other words, the second wing plate 442 may move in the +y direction during the transition from the closed state to the opened state.

At a section in which the first wing plate 441 contacts the arm 460, the first wing plate 441 may include an area in which a bending angle decreases in the −z direction. In an embodiment, as shown in FIG. 4A, when the first wing plate 441 closely contacts the housing 490, in other words, when the first wing plate 441 is in the closed state, the bending angle of the first wing plate 441 may be approximately 135 degrees at a portion in which the first wing plate 441 contacts the arm 460, for example. As shown in FIG. 4B, when the first wing plate 441 is in the opened state, the bending angle of the first wing plate 441 may be approximately 90 degrees at the portion in which the first wing plate 441 contacts the arm 460. The bending angle of the first wing plate 441 may be one factor determining a frictional force between the first wing plate 441 and the arm 460.

The elastic body 450 may be provided between the main shaft 430 and the switch 420. When an external force is not applied to the switch 420, the elastic body 450 may support the switch 420 to return to an initial position when the switch 420 is distanced from the bottom surface of the outlet groove C1, for example. The elastic body 450 may be connected to the switch 420 and the main shaft 430. In an embodiment, one end of the elastic body 450 may be connected to the main shaft 430 and the other end of the elastic body 450 may be connected to the switch 420, for example. According to the structure described above, the switch 420 may be prevented from escaping to the outside of the housing 490. In an embodiment, when opposite ends of the elastic body 450 are not fixed to the main shaft 430 and the switch 420, respectively, the housing 490 may include a stopper (not shown) for preventing the switch 420 from escaping, for example. In an embodiment, the elastic body 450 may be a spring or rubber, for example.

The arm 460 may be connected to the switch 420 and may press the wing plate 440 as the arm 460 integrally moves with the switch 420. The arm 460 may extend in a direction facing the main shaft 430 from the switch 420, in other words, in the −z direction from the switch 420. According to the shape described above, when the switch 420 does not contact the main shaft 430, the arm 460 may press an inner side surface of the wing plate 440. Herein, the inner side surface of the wing plate 440 may be a direction facing the switch 420 in the wing plate 440 and the outer side surface of the wing plate 440 may be a direction facing the outside.

The arm 460 may include or consist of a material that is different from the first wing plate 441 to prevent damage to the first wing plate 441. In an embodiment, the arm 460 may have a surface or a shape having a lower coefficient of friction than that of the first wing plate 441, for example. The arm 460 may include or consist of a metallic material or may include or consist of a non-metallic material, as desired. To reduce the coefficient of friction, a lubricant may be applied to the surface of the arm 460, or a coating layer may be provided on the surface of the arm 460.

The arm 460 may be spaced apart from the switch 420 in the y-axis direction intersecting the longitudinal direction of the switch 420. According to the structure described above, a location where the arm 460 contacts the wing plate 440 may be spaced apart from the main shaft 430, which is the center of rotation of the wing plate 440. As a distance of an action point from the rotation center of the wing plate 440 increases, the wing plate 440 may rotate with a relatively small force.

A plurality of arms 460 may be provided. In an embodiment, the plurality of arms 460 may include a first arm 461 for pressing the first wing plate 441 and a second arm 462 for pressing the second wing plate 442, for example. The first arm 461 and the second arm 462 may extend in opposite directions to each other based on the y-axis. The first arm 461 and the second arm 462 may be unitary as a semicircular shape.

The connection line 470 may extend from the wing plate 440. The connection line 470 may be physically and/or electrically connected to a ground of an electronic device (e.g., the electronic device 100 of FIG. 1). The connection line 470 may support the connection of an electronic device (e.g., the electronic device 100 of FIG. 1) to a ground of a building together with the wing plate 440 and the grounding terminal C3. The housing 490 may define a hole for accommodating the connection line 470 therein. A ground connection structure may have a structure sequentially connecting the grounding terminal C3, the wing plate 440, the shaft 430, and the connection line 470. As the connection line 470 is not directly connected to the wing plate 440, a phenomenon in which the connection line 470 is directly deformed by a rotational motion of the wing plate 440 may be prevented.

Figure 5A:
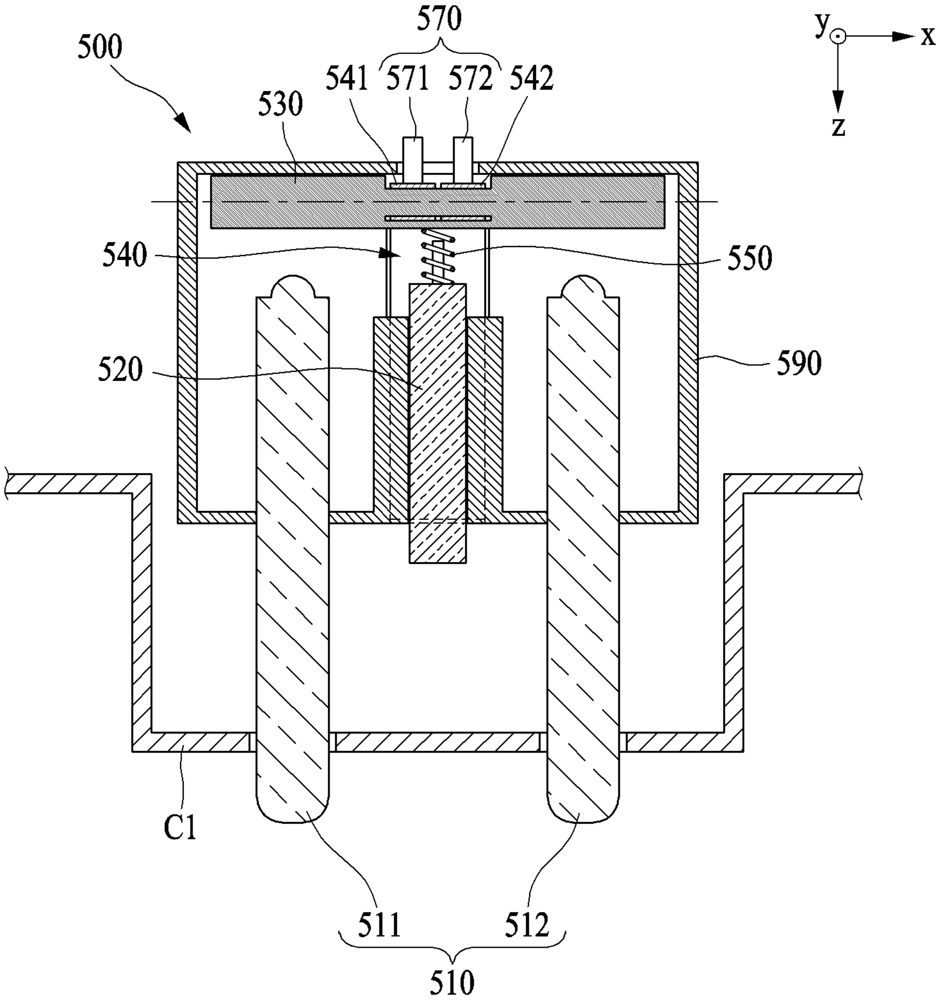
FIG. 5A is a cross-sectional view taken along line V-V of FIG. 3 and illustrating a wing plate in a closed state.
Figure 5B:
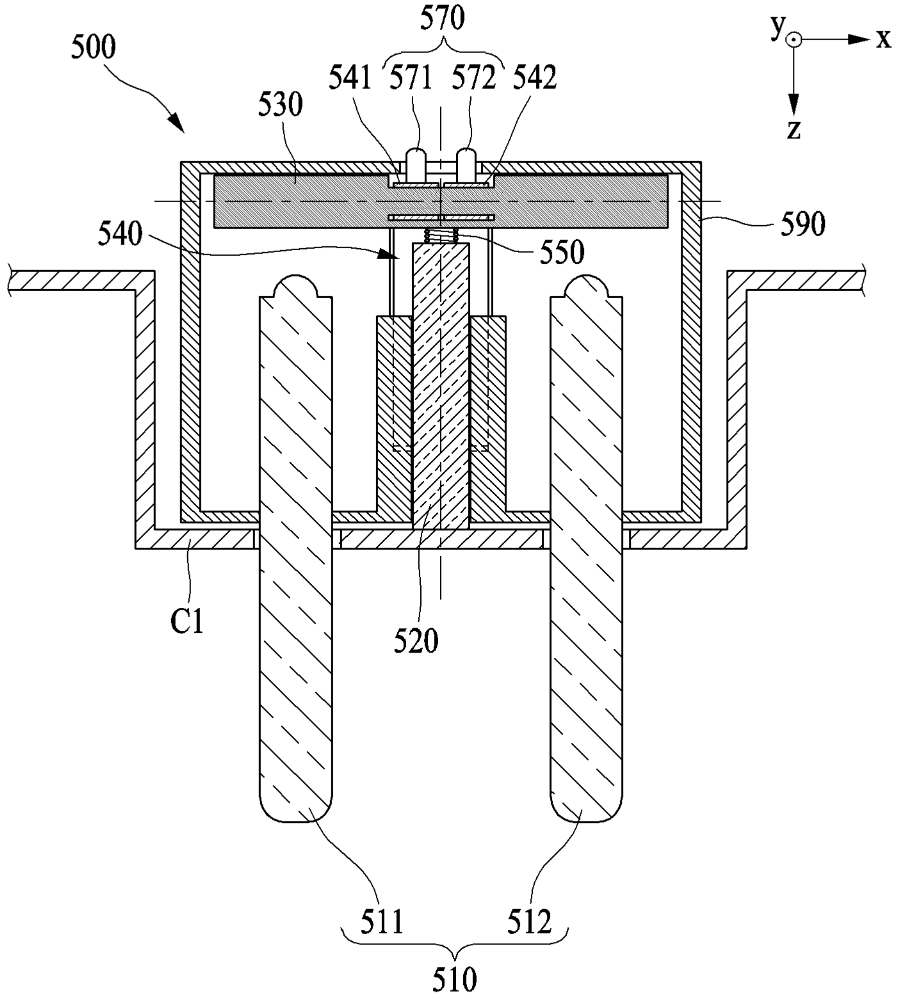
FIG. 5B is a cross-sectional view taken along line V-V of FIG. 3 and illustrating a wing plate in an opened state.

FIG. 5A is a cross-sectional view taken along line V-V of FIG. 3 and illustrating a wing plate in a closed state. FIG. 5B is a cross-sectional view taken along line V-V of FIG. 3 and illustrating a wing plate in an opened state.

Referring to FIGS. 5A and 5B, in an embodiment, an adapter 500 may include a housing 590, a pair of pins 510, a switch 520, a main shaft 530, a pair of wing plates 540, an elastic body 550, an arm, and a pair of connection lines 570.

The pair of pins 510 may include a first pin 511 and a second pin 512 spaced apart from each other in the x-axis direction.

The pair of wing plates 540 may include a first wing plate 541 and a second wing plate 542 independently rotatable around the main shaft 530. The first wing plate 541 and the second wing plate 542 may rotate in opposite directions to each other. The first wing plate 541 and the second wing plate 542 may independently rotate while not mutually affecting. In an embodiment, when the second wing plate 542 or an arm pressing the second wing plate 542 is damaged, the first wing plate 541 may normally operate regardless of the second wing plate 542, for example.

The pair of connection lines 570 may include a first connection line 571 connected to the first wing plate 541 and a second connection line 572 connected to the second wing plate 542.

Figure 6:
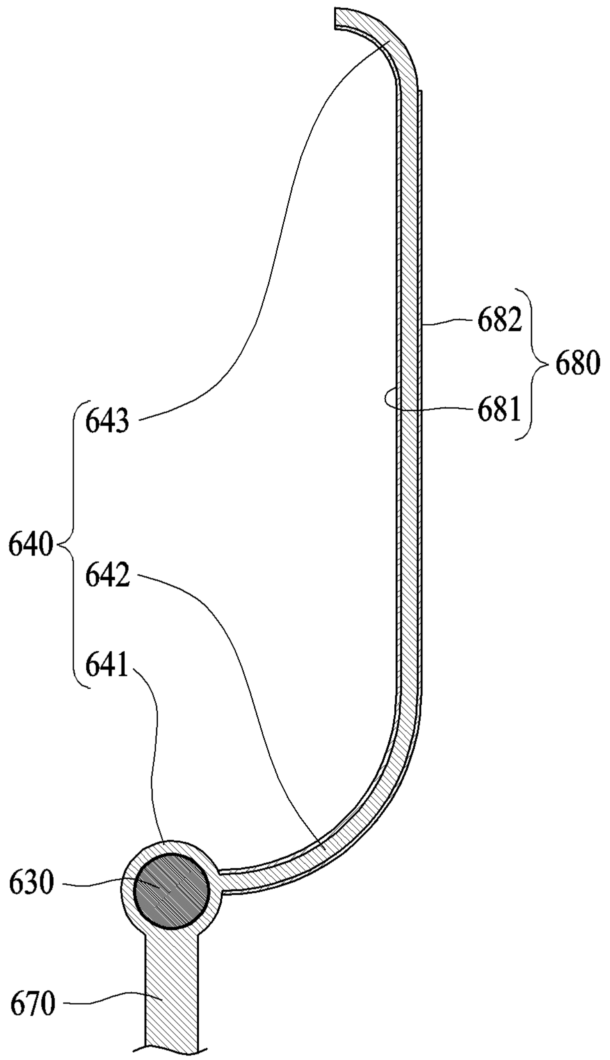
FIG. 6 is a cross-sectional view of an embodiment of a main shaft, a wing plate, and a connection line.

FIG. 6 is a cross-sectional view of an embodiment of a main shaft, a wing plate, and a connection line.

Referring to FIG. 6, in an embodiment, a wing plate 640 may include a plate connecting part 641 covering a main shaft 630 and rotatably connected to the main shaft 630, plate body 642 extending from the plate connecting part 641, and a plate head 643 extending from the plate body 642 and contactable with a grounding terminal (not shown) of an outlet. A connection line 670 may be extended to the plate connecting part 641.

The plate head 643 may have a curved shape to approach a switch (not shown) as the plate head 643 moves away from the plate body 642. In an embodiment, the plate head 643 may have a convex shape in a direction away from the main shaft 630, for example. According to the shape described above, the wing plate 640 may contact a grounding terminal (not shown) with its convex surface and when the wing plate 640 is in a closed state, in the wing plate 640, an area disposed on an edge of the housing may have a curved shape, and thus, safety may be improved.

An adapter may further include an insulating layer 680 covering the plate body 642. The insulating layer 680 may include an inner insulating layer 681 covering an inner side surface of the plate body 642 and an outer insulating layer 682 covering an outer side surface of the plate body 642. The inner insulating layer 681 may cover the inner side surface of the plate head 643. The insulating layer 680 may improve contact stability of the adapter.

Figure 7:
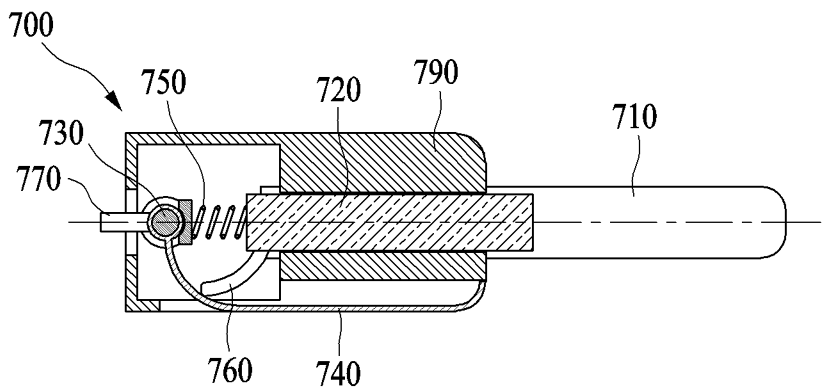
FIG. 7 is a cross-sectional view of an embodiment of an adapter capable of protective grounding.

FIG. 7 is a cross-sectional view of an embodiment of an adapter capable of protective grounding.

Referring to FIG. 7, in an embodiment, an adapter 700 may include a housing 790, a pin 710, a switch 720, a main shaft 730, a wing plate 740, an elastic body 750, an arm 760, and a connection line 770. The wing plate 740 may be provided on only one side unlike the wing plate 440 of FIG. 4A.

Figure 8:
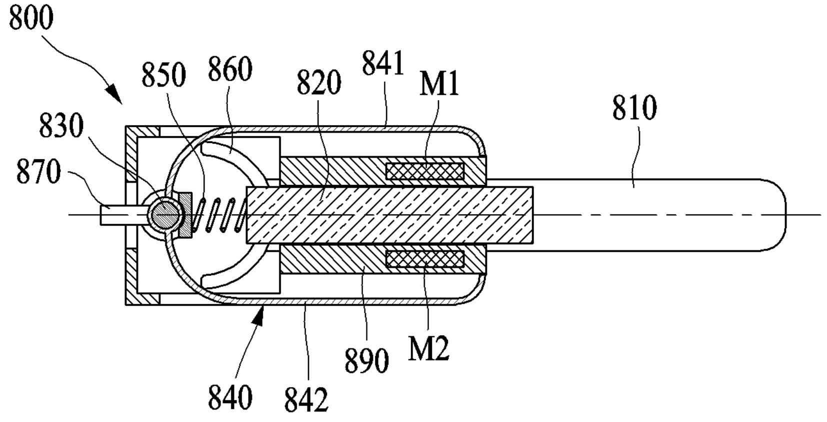
FIG. 8 is a cross-sectional view of an embodiment of an adapter capable of protective grounding.

FIG. 8 is a cross-sectional view of an adapter capable of protective grounding.

Referring to FIG. 8, in an embodiment, an adapter 800 may include a housing 890, a pin 810, a switch 820, a main shaft 830, a pair of wing plates 840, an elastic body 850, an arm 860, a connection line 870, and a pair of magnets M1 and M2.

The pair of magnets M1 and M2 may be provided in the housing 890 and may interact with the pair of wing plates 840. The pair of magnets M1 may include a first magnet M1 applying an attraction force to a first wing plate 841 and a second magnet M2 applying an attraction force to a second wing plate 842. The pair of magnets M1 and M2 may support the wing plate 840 to prevent the wing plate 840 from being unintentionally switched to the opened state when the wing plate 840 is in the closed state.

In an embodiment, referring back to FIGS. 4A and 4B, the adapter 400 capable of protective grounding may include the housing 490, the pair of pins 410 connected to the housing, the switch 420 connected to the housing to be translationally movable relative to the housing and including at least a portion exposed to an outside of the housing, the main shaft 430 fixed to an inside of the housing, at least one wing plate 440 rotatably connected to the main shaft and able to be open or closed relative to the housing, the elastic body 450 provided between the main shaft and the switch, and at least one arm 460 connected to the switch and pressing the wing plate by integrally moving with the switch.

In an embodiment, the pair of pins 410 may be spaced apart from each other in a first direction, and the wing plate may be movable in a second direction intersecting the first direction.

In an embodiment, the switch 420 may be provided in parallel with the pair of pins and may be translationally movable in a direction parallel with a longitudinal direction of each of the pair of pins.

In an embodiment, the switch 420 may be disposed between the pair of pins.

In an embodiment, the housing 490 may include the housing body defining a guide hole guiding movement of the switch, and the receiving groove recessed from an outer side surface of the housing body and accommodating the wing plate.

In an embodiment, the elastic body 450 may be connected to the switch and the main shaft.

In an embodiment, referring back to FIG. 6, the wing plate 640 may include the plate connecting part 641 covering the main shaft and rotatably connected to the main shaft, the plate body 642 extending from the plate connecting part, and the plate head 643 extending from the plate body and contactable with a grounding terminal of an outlet.

In an embodiment, the plate head 643 may include a curved shape to approach the switch as the plate head moves away from the plate body.

In an embodiment, the adapter may further include the insulating layer 680 covering the plate body 642.

In an embodiment, the insulating layer 680 may cover a surface of the plate head facing the switch.

In an embodiment, referring back to FIGS. 4A and 4B, when an external force is not applied, at least a portion of the switch 420 may protrude toward an outside of the housing by being supported by the elastic body.

In an embodiment, the length L3 in which the switch 420 protrudes from the housing may be less than the length L4 in which the pair of pins 410 protrudes from the housing.

In an embodiment, the at least one arm 460 may include the first arm 461 and the second arm 462 provided on opposite sides to each other based on a central axis of the switch, and the at least one wing plate 440 may include the first wing plate 441 pressed by the first arm and the second wing plate 442 pressed by the second arm.

In an embodiment, the first wing plate 441 and the second wing plate 442 may be independently and rotatably connected to the main shaft.

In an embodiment, the adapter may further include a magnet provided in the housing and interactable with the wing plate.

In an embodiment, the adapter 400 capable of protective grounding may be an adapter disposed (e.g., mounted) on the outlet C which defines an outlet groove C1 including a bottom surface in which two outlet holes C2 are defined, and includes the grounding terminal C3 provided on one side of the outlet groove, and the adapter 400 may include the housing 490 inserted into the outlet groove, the pair of pins 410 connected to the housing and inserted into the two outlet holes, the switch 420 connected to the housing to be translationally movable relative to the housing and including at least a portion exposed to an outside of the housing, the main shaft 430 fixed to an inside of the housing, at least one wing plate 440 rotatably connected to the main shaft and contactable with the grounding terminal, an elastic body 450 provided between the main shaft and the switch, and at least one arm 460 connected to the switch and pressing the wing plate such that the wing plate contacts the grounding terminal.

In an embodiment, the pair of pins 410 may be spaced apart from each other in a first direction, and the wing plate 440 may be movable in a second direction intersecting the first direction.

In an embodiment, the housing 490 may include a housing body defining a guide hole guiding movement of the switch, and a receiving groove recessed from an outer side surface of the housing body and accommodating the wing plate.

In an embodiment, referring back to FIG. 6, the wing plate 640 may include the plate connecting part 641 covering the main shaft and rotatably connected to the main shaft, the plate body 642 extending from the plate connecting part, and the plate head 643 extending from the plate body and contactable with a grounding terminal of an outlet.

In an embodiment, referring back to FIGS. 4A and 4B, the adapter capable of protective grounding, may include the housing 490 including a housing body including an outer side surface from which a receiving groove is recessed, the pair of pins 410 connected to the housing, the switch 420 connected to the housing to be translationally movable relative to the housing, disposed between the pair of pins, provided in parallel with the pins, and including at least a portion exposed to an outside of the housing, the main shaft 430 fixed to an inside of the housing, at least one wing plate 440 rotatably connected to the main shaft, the elastic body 450 provided between the main shaft and the switch, and at least one arm 460 connected to the switch and pressing the wing plate by integrally moving with the switch, where the wing plate may be provided in one of a closed state in which the wing plate is inserted into the receiving groove and an opened state in which the wing plate escapes from the receiving groove.

Although the display devices and the display devices in the embodiments have been described with reference to the drawings, the illustrated embodiments are examples, and may be modified and changed by a person having ordinary knowledge in the relevant technical field without departing from the technical spirit described in the following claims.

What is claimed is:

1. An adapter capable of protective grounding, the adapter comprising:

a housing;

a pair of pins connected to the housing;

a switch connected to the housing to be translationally movable relative to the housing, the switch including at least a portion exposed to an outside of the housing;

a main shaft fixed to an inside of the housing;

at least one wing plate rotatably connected to the main shaft and is open or closed relative to the housing;

an elastic body provided between the main shaft and the switch; and at least one arm connected to the switch and pressing the at least one wing plate by integrally moving with the switch.

2. The adapter of claim 1, wherein the pair of pins is spaced apart from each other in a first direction, and the at least one wing plate is movable in a second direction intersecting the first direction.

3. The adapter of claim 1, wherein the switch is provided in parallel with the pair of pins and is translationally movable in a direction parallel with a longitudinal direction of each of the pair of pins.

4. The adapter of claim 3, wherein the switch is disposed between the pair of pins.

5. The adapter of claim 1, wherein the housing comprises:

a housing body defining a guide hole guiding movement of the switch, and a receiving groove is recessed from an outer side surface of the housing body and accommodates the at least one wing plate.

6. The adapter of claim 1, wherein the elastic body is connected to the switch and the main shaft.

7. The adapter of claim 1, wherein the at least one wing plate comprises:

a plate connecting part covering the main shaft and rotatably connected to the main shaft;

a plate body extending from the plate connecting part; and a plate head extending from the plate body and contactable with a grounding terminal of an outlet.

8. The adapter of claim 7, wherein the plate head comprises a curved shape to approach the switch as the plate head moves away from the plate body.

9. The adapter of claim 7, further comprising:

an insulating layer covering the plate body.

10. The adapter of claim 9, wherein the insulating layer covers a surface of the plate head facing the switch.

11. The adapter of claim 1, wherein, when an external force is not applied, at least a portion of the switch protrudes toward an outside of the housing by being supported by the elastic body.

12. The adapter of claim 11, wherein a length in which the switch protrudes from the housing is less than a length in which the pair of pins protrudes from the housing.

13. The adapter of claim 1, wherein the at least one arm comprises a first arm and a second arm provided on opposite sides to each other based on a central axis of the switch, and the at least one wing plate comprises a first wing plate pressed by the first arm and a second wing plate pressed by the second arm.

14. The adapter of claim 13, wherein the first wing plate and the second wing plate are independently and rotatably connected to the main shaft.

15. The adapter of claim 1, further comprising:

a magnet provided in the housing and interactable with the at least one wing plate.

16. An adapter disposed on an outlet which defines an outlet groove including a bottom surface in which two outlet holes are defined and includes a grounding terminal provided on one side of the outlet groove, the adapter comprising:

a housing inserted into the outlet groove;

a pair of pins connected to the housing and inserted into the two outlet holes;

a switch connected to the housing to be translationally movable relative to the housing, the switch including at least a portion exposed to an outside of the housing;

a main shaft fixed to an inside of the housing;

at least one wing plate rotatably connected to the main shaft and contactable with the grounding terminal;

an elastic body provided between the main shaft and the switch; and at least one arm connected to the switch and pressing the at least one wing plate so that the at least one wing plate contacts the grounding terminal.

17. The adapter of claim 16, wherein the pair of pins is spaced apart from each other in a first direction, and the at least one wing plate is movable in a second direction intersecting the first direction.

18. The adapter of claim 16, wherein the housing comprises:

a housing body defining a guide hole guiding movement of the switch, and a receiving groove is recessed from an outer side surface of the housing body and accommodates the at least one wing plate.

19. The adapter of claim 16, wherein the at least one wing plate comprises:

a plate connecting part covering the main shaft and rotatably connected to the main shaft;

a plate body extending from the plate connecting part; and a plate head extending from the plate body and contactable with the grounding terminal of the outlet.

20. An adapter capable of protective grounding, the adapter comprising:

a housing comprising a housing body including an outer side surface from which a receiving groove is recessed;

a pair of pins connected to the housing;

a switch connected to the housing to be translationally movable relative to the housing, disposed between the pair of pins, and provided in parallel with the pair of pins, the switch including at least a portion exposed to an outside of the housing;

a main shaft fixed to an inside of the housing;

a wing plate rotatably connected to the main shaft;

an elastic body provided between the main shaft and the switch; and at least one arm connected to the switch and pressing the wing plate by integrally moving with the switch, wherein the wing plate is provided in one of a closed state in which the wing plate is inserted into the receiving groove and an opened state in which the wing plate escapes from the receiving groove.

* * * * *